(12) United States Patent
Harwood et al.

(10) Patent No.: US 11,132,185 B2
(45) Date of Patent: Sep. 28, 2021

(54) EMBEDDING OF MULTIPLE VERSIONS IN MONOLITHIC APPLICATIONS DURING COMPILATION

(71) Applicant: Microsoft Technology Licensing, LLC, Redmond, WA (US)

(72) Inventors: Peter Kenneth Harwood, Bellevue, WA (US); Ilker Celikyilmaz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/057,183

(22) Filed: Aug. 7, 2018

(65) Prior Publication Data
US 2020/0050436 A1   Feb. 13, 2020

(51) Int. Cl.
*G06F 8/41* (2018.01)
*G06F 8/65* (2018.01)
*G06F 8/71* (2018.01)

(52) U.S. Cl.
CPC ............... *G06F 8/443* (2013.01); *G06F 8/65* (2013.01); *G06F 8/71* (2013.01)

(58) Field of Classification Search
CPC ..... G06F 8/71; G06F 8/65; G06F 8/41; G06F 8/443; G06F 2221/0724; G06F 8/447
See application file for complete search history.

(56) References Cited

U.S. PATENT DOCUMENTS

| 5,581,764 A | 12/1996 | Fitzgerald et al. |
| 5,715,461 A | 2/1998 | Yoshitomi |
| 5,956,505 A | 9/1999 | Manduley |
| 6,324,693 B1 | 11/2001 | Brodersen et al. |

(Continued)

FOREIGN PATENT DOCUMENTS

CN            106293744 A       1/2017

OTHER PUBLICATIONS

"Dead code detection and removal", Retrieved from: http://www.aivosto.com/vbtips/deadcode.html, Mar. 5, 2005, 7 Pages.
(Continued)

*Primary Examiner* — S. Sough
*Assistant Examiner* — Cheneca Smith
(74) *Attorney, Agent, or Firm* — Michael Best & Friedrich LLP

(57) ABSTRACT

A system for updating a monolithic application. The system includes an electronic processor. The electronic processor is configured to receive a new version of the monolithic application. The new version of the monolithic application includes a first set of computer readable instructions. The electronic processor is configured to create a new class that defines a previous version of the monolithic application. The previous version of the monolithic application includes a second set of computer readable instructions. The electronic processor is also configured to compile the monolithic application to combine the new version of the monolithic application and the previous version of the monolithic application into an executable file, receive a selection of a version of the monolithic application to execute, and execute computer executable instructions in the executable file corresponding to the received selection of a version of the monolithic application.

20 Claims, 6 Drawing Sheets

(56) References Cited

U.S. PATENT DOCUMENTS

| | | | |
|---|---|---|---|
| 6,334,215 | B1 | 12/2001 | Barker et al. |
| 6,487,713 | B1 | 11/2002 | Cohen et al. |
| 6,876,314 | B1 | 4/2005 | Lin |
| 8,181,153 | B2 | 5/2012 | Grechanik |
| 8,397,188 | B1 | 3/2013 | Scheidt |
| 8,527,943 | B1 | 9/2013 | Chiluvuri |
| 8,631,395 | B2 | 1/2014 | Sathyanathan et al. |
| 8,719,786 | B2 | 5/2014 | Waddington |
| 8,726,264 | B1 * | 5/2014 | Allen ............... G06F 8/658 717/168 |
| 8,737,981 | B2 | 5/2014 | Jacobs et al. |
| 8,943,470 | B2 | 1/2015 | Behr et al. |
| 9,037,546 | B2 | 5/2015 | Wong et al. |
| 9,244,673 | B2 | 1/2016 | Chinn et al. |
| 2002/0013938 | A1 | 1/2002 | Duesterwald et al. |
| 2002/0178434 | A1 | 11/2002 | Fox et al. |
| 2004/0255291 | A1 | 12/2004 | Sierer et al. |
| 2005/0198630 | A1 | 9/2005 | Tamma et al. |
| 2005/0262494 | A1 | 11/2005 | Fung et al. |
| 2006/0236317 | A1 | 10/2006 | Wetherly et al. |
| 2007/0055965 | A1 * | 3/2007 | Colyer ............... G06F 8/316 717/143 |
| 2010/0131477 | A1 * | 5/2010 | Schneider ............ G06F 16/10 707/694 |
| 2010/0199259 | A1 | 8/2010 | Quinn et al. |
| 2011/0153559 | A1 * | 6/2011 | Rangarajan ......... G06F 40/174 707/609 |
| 2012/0102474 | A1 | 4/2012 | Artzi et al. |
| 2013/0061205 | A1 | 3/2013 | Bohm et al. |
| 2014/0229916 | A1 * | 8/2014 | Bates ............... G06F 11/362 717/124 |
| 2015/0205600 | A1 | 7/2015 | Grillo et al. |
| 2016/0098270 | A1 | 4/2016 | Hanusiak et al. |
| 2016/0147547 | A1 | 5/2016 | Elias et al. |
| 2016/0246594 | A1 | 8/2016 | Shoavi et al. |
| 2017/0006129 | A1 | 1/2017 | Raja et al. |
| 2017/0351506 | A1 | 12/2017 | Celikyilmaz |

OTHER PUBLICATIONS

"How can I roll-back a ClickOnce application?", Retrieved from: https://stackoverflow.com/questions/199348/how-can-i-roll-back-a-clickonce-application, Aug. 12, 2012, 9 Pages.

"Program Optimizations using Data-Flow Analysis", Retrieved from: http://www.cs.colostate.edu/~mstrout/CS553Fall06/slides/lecture11-dataflowopts.pdf, Retrieved on Apr. 7, 2016, 6 Pages.

"Redeploying Applications in a Production Environment", Retrieved from: https://docs.oracle.com/cd/E24329_01/web.1211/e24443/redeploy.htm#DEPGD258, Jan. 14, 2012, 22 Pages.

"Non Final Office Action Issued in U.S. Appl. No. 15/175,055", dated Jun. 16, 2017, 19 Pages.

"Notice of Allowance Issued in U.S. Appl. No. 15/175,055", dated Oct. 6, 2017, 8 Pages.

Bubeck, et al., "BRIDE—A toolchain for framework-independent development of industrial service robot applications", In Proceedings of 41st International Symposium on Robotics, ISR/Robotik 2014, Jun. 2, 2014, pp. 137-142.

Chen, et al., "A C++ Data Model Supporting Reachability Analysis and Dead Code Detection", In Proceedings of the 6th European Software Engineering conference held jointly with the 5th ACM SIGSOFT international symposium on Foundations of software engineering, ESEC '97/FSE-5, Sep. 22, 1997, pp. 414-431.

Ebraert, et al., "Feature Diagrams for Change-Oriented Programming", In Proceedings of the 10th International Conference on Feature Interactions in Software and Communication Systems (ICFI'09), Jun. 2009, 16 Pages.

Febranyah, "A Feature-Based Approach to Automating High-Level Process Planning", In Dissertation Submitted in Partial Fulfilment of the degree of Doctor of Philosophy to North Carolina State University, Jul. 12, 2001, 164 Pages.

Geneves, et al., "Eliminating Dead-Code from X Query Programs", In Proceedings of 2010 ACM/IEEE 32nd International Conference on Software Engineering, May 2, 2010, 2 Pages.

Kaiser, et al., "Melding Software Systems from Reusable Building Blocks", In Proceedings of IEEE Software, Issue 4, vol. 4, Jul. 1987, 8 Pages.

Kovse, et al., "VS-Gen: A case study of a product line for versioning systems", In Lecture Notes on Computer Science, vol. 3286, Oct. 24, 2004, pp. 396-415.

Li, et al., "A Wrapper Generator for Wrapping High Performance Legacy Codes as Java/CORBA Components", In Proceedings of the ACM/IEEE Conference on Supercomputing, Nov. 4, 2000, 12 Pages.

Lin, Jing, "Automatic Removal of Unused Code for Software Testing", Thesis Submitted in Partial Fulfilment of Degree of Bachelor of Computer Science, Jan. 20, 2015, 69 Pages.

Mathew, Suresh, "Zero Downtime, Instant Deployment and Rollback", Retrieved from: https://www.ebayinc.com/stories/blogs/tech/zero-downtime-instant-deployment-and-rollback/, Nov. 21, 2013, 9 Pages.

"International Search Report and Written Opinion Issued in PCT Application No. PCT/US2017/034105", dated Aug. 30, 2017, 12 Pages.

Shah, Jami J., "Feature transformations between application-specific feature spaces", In Journal of Computer-Aided Engineering, vol. 5, Issue: 6, Dec. 1988, pp. 247-255.

Streitel, et al., "Dead Code Detection on Class Level", In Journal of Softwaretechnik-Trends, vol. 34, Issue 2 Retrieved from: https://www.cqse.eu/publications/2014-dead-code-detection-on-class-level.pdf, May 2014, 2 Pages.

Vlasenko, Denys, "Link time dead code and data elimination using GNU toolchain", In Proceedings of CELF Embedded Linux Conference, Apr. 12, 2010, 18 Pages.

Whitefield, et al., "An Approach for Exploring Code-Improving Transformations", In Proceedings of ACM Transactions on Programming Languages and Systems (TOPLAS), vol. 19, Issue 6, Nov. 1997, pp. 1053-1084.

Zuniga, Prieto, et al., "Dynamic reconfiguration of cloud application architectures", In Journal of Software: Practice and Experience, vol. 48, Issue 2, Retrieved from: https://onlinelibrary.wiley.com/doi/pdf/10.1002/spe.2457, Oct. 24, 2016, 2 Pages.

"International Search Report and Written Opinion Issued in PCT Application No. PCT/US2019/038819", dated Sep. 18, 2019, 13 Pages.

* cited by examiner

FIG. 4

Version 100

Class A
```
public void methodA() {
}
private void methodB() {
}
//do something in Class A
public void methodC() {
}
```

Class B
```
public void methodX() {
}
public void methodY() {
}
//do something in Class B
public void methodZ() {
}
```

Version 101
Also contains version 100

Class A
```
public void methodA() {
}
private void methodB() {
}
//do something in Class A
//and do something more in Version
//101
public void methodC() {
}
```

Class A_Version100
```
private void methodB() {
}
//do something in Class A
```

Class B
```
public void methodX() {
}
public void methodY() {
}
//do something in Class B
public void methodZ() {
}
```

Version 102
Also contains version 100 & 101

Class A
```
public void methodA() {
}
private void methodB() {
}
//do something in Class A
//and do something more in Version
//101
public void methodC() {
}
```

Class A_Version100
```
private void methodB() {
}
//do something in Class A
```

Class B
```
public void methodX() {
}
public void methodY() {
}
//do something different in
//Version 102
public void methodZ() {
}
```

Class B_Version101
```
public void methodY() {
}
//do something in Class B
```

Version 103
Also contains version 101 & 102

Class A
```
public void methodA() {
}
private void methodB() {
}
//do something in Class A
//and do something more in Version
//101
public void methodC() {
}
```

Class B
```
public void methodX() {
}
public void methodY() {
}
//do something different in
//Version 102
public void methodZ() {
}
```

Class B_Version101
```
public void methodY() {
}
//do something in Class B
```

FIG. 6

```
public class MyImplementation
{
   public ConsoleColor DoSomething(string text, int i)
   {
      ConsoleColor result;
      CustomArguments args = new CustomArguments(new Tuple<string, int>(text, i));

_objOfColoredTextReleaseV1.OnEntry(args);
      switch (args.FlowBehavior)
      {
        case Action.Return:
           result = (ConsoleColor) args.ReturnValue;
           return result;
      }
      Console.WriteLine(string.Format("MyImplementation.DoSomething execution using '{0}' and {1}", stringVariable, i));
      Console.ForegroundColor = ConsoleColor.Red;
      Console.WriteLine("Red Button is Displayed, {0}", stringVariable);
      ConsoleColor consoleColor = ConsoleColor.Red;
      result = consoleColor;
      return result;
   }
}
-----------
public override void OnEntry(CustomArguments args)
{
   bool flag = this.isVersionEnabled();
   if (flag)
   {
      args.ReturnValue = this.ThisVersionFlow(args.Arguments.ToArray());
      args.Action = Action.Return;
   }
}
```

EMBEDDING OF MULTIPLE VERSIONS IN MONOLITHIC APPLICATIONS DURING COMPILATION

FIELD

Embodiments described herein relate to updating a monolithic application to include a new version while maintaining a previous version.

SUMMARY

In large monolithic applications deploying a new version is difficult. A monolithic application is an application that includes a plurality of computer readable instructions, is not componentized, and is compiled. A monolithic application is often maintained by a server and distributed to a plurality of user devices. The lack of modularity of a monolithic application requires the monolithic application to be recompiled in order to incorporate a change made in the new version of the monolithic application. Compiling a monolithic application produces a compiled monolithic application (an executable file) that includes a plurality of computer executable instructions.

Sometimes, the change to the monolithic application may cause the compiled monolithic application to have an undesirable outcome when executed (deployed to a plurality of user devices). For example, the monolithic application may have reduced functionality, reduced speed, or both. In this case, it may be desirable to revert the monolithic application to a previous version, before the change was made. However, it is often difficult to revert the monolithic application to a previous version.

There exist several solutions for deploying a new version of a monolithic application, including flighting and kill switches. Flighting involves deploying a new version of an application to a group of users, enabling the new version for a limited number of users, and receiving feedback about the new version of the application before deploying it to a larger number of users. Kill switches are a solution that complements flighting. To implement a kill switch an administrator adds computer readable instructions (for example, if/else statements) that protect computer readable instructions associated with an old version of an application while adding computer readable instructions associated with a new version of the application.

However, these solutions are time consuming because they require, for example, down time or staggered deployment of the new version of the monolithic application, and have a large overhead because they may require, for example, binary files to be reloaded when a different version of the monolithic application is selected to be executed. These solutions also lead to messy or cluttered computer readable instructions (code) which will require an administrator to spend time cleaning up the computer executable instructions. Therefore, there is a need for a system which automatically maintains a predetermined number of versions of a monolithic application and allows an administrator to quickly revert a monolithic application to a previous version.

Embodiments described herein provide, for example, a solution that maintains a limited number of computer readable instructions associated with each version of a monolithic application, compiles the monolithic application to produce an executable file with computer executable instructions, and determines, at runtime, which computer executable instructions to execute (deploy to user devices) based on a selected version of the monolithic application received from an administrator device. The solution described by the embodiments herein also allows, for example, for automatic graduation of versions of the monolithic application (the maintenance of a predetermined number of versions of the monolithic application).

One embodiment provides a system for updating a monolithic application. The system includes an electronic processor. The electronic processor is configured to receive a new version of the monolithic application. The new version of the monolithic application includes a first set of computer readable instructions. The electronic processor is configured to create a new class that defines a previous version of the monolithic application. The previous version of the monolithic application includes a second set of computer readable instructions. The electronic processor is also configured to compile the monolithic application to combine the new version of the monolithic application and the previous version of the monolithic application into an executable file, receive a selection of a version of the monolithic application to execute, and execute computer executable instructions in the executable file corresponding to the received selection of a version of the monolithic application.

Another embodiment provides a method of updating a monolithic application. The method includes receiving a new version of the monolithic application that includes a first set of computer readable instructions and creating, with an electronic processor, a new class that defines a previous version of the monolithic application that includes a second set of computer readable instructions. The method also includes establishing, with the electronic processor, version flow during compilation of the monolithic application into an executable file and determining which computer executable instructions in the executable file to execute at runtime.

Yet another embodiment provides a non-transitory, computer-readable medium storing instructions that, when executed by an electronic processor, perform a set of functions. The set of functions include receiving a new version of a monolithic application that includes a first set of computer readable instructions and creating a new class that defines a previous version of the monolithic application. The previous version of the monolithic application includes a second set of computer readable instructions. The set of functions also include compiling the monolithic application to combine the new version of the monolithic application and the previous version of the monolithic application into an executable file, receiving a selection of a version of the monolithic application to execute, and executing computer executable instructions in the executable file corresponding to the received selection of a version of the monolithic application.

BRIEF DESCRIPTION OF THE DRAWINGS

FIG. 4 graphically illustrates an example of version management software included in the server of FIG. 2 maintaining three versions of the monolithic application 215 included in the server of FIG. 2 according to one embodiment.

FIG. 6 illustrates an example of an executable file included in the server of FIG. 2.

DETAILED DESCRIPTION

Figure 1:
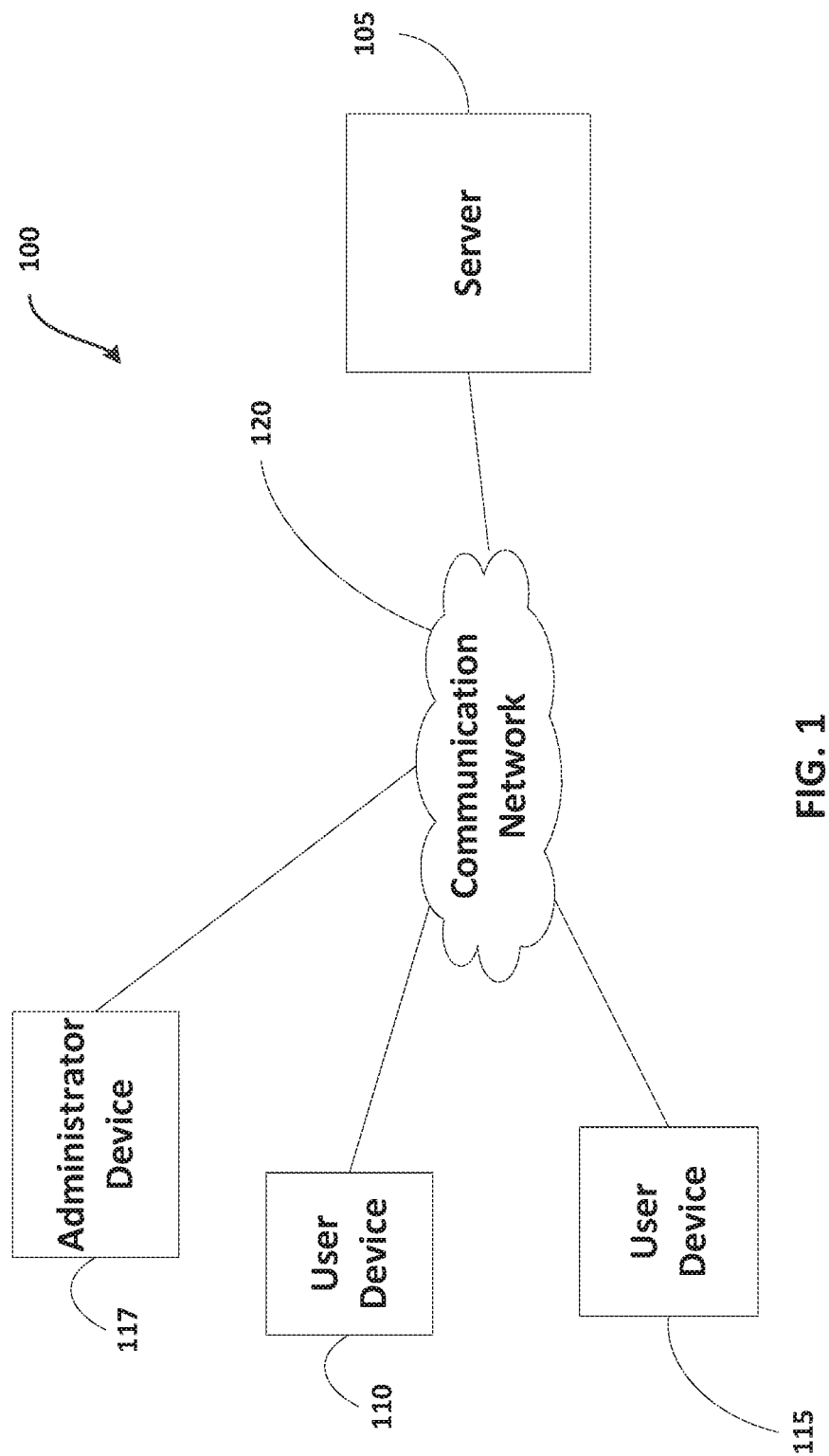
FIG. 1 schematically illustrates a system for updating a monolithic application according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. In addition, relational terms such as first and second, top and bottom, and the like may be used herein solely to distinguish one entity or action from another entity or action without necessarily requiring or implying any actual such relationship or order between such entities or actions.

Embodiments herein describe, among other things, a system for updating a monolithic application. The system allows a new version of the monolithic application to exist alongside a predetermined number (a plurality) of previous versions of the monolithic application. In the embodiments described herein, previous versions of a monolithic application are maintained by creating a new class when there is a difference in a second set of computer readable instructions included in a class in a previous version of the monolithic application and a first set of computer readable instructions included in a corresponding class in a new version of the application. In the embodiments described herein, a class is a template in object oriented programming in which a plurality of types of objects are defined and, in many instances, initial values for state (member variables) and implementations of behavior (member functions or methods) are provided. In certain embodiments, each new class includes at least one method that has computer readable instructions in the new version of the monolithic application that are different from the computer-readable instructions in the previous version of the monolithic application.

When the monolithic application is compiled, computer executable instructions associated with each version of the monolithic application maintained by the electronic processor are included in an executable file generated by a compiler. At runtime, the computer executable instructions executed by the electronic processor are those associated with a version of the monolithic application selected via an administrator device.

FIG. 1 illustrates a system 100 for updating a monolithic application containing a set of computer readable instructions. In the example shown, the system 100 includes a plurality of servers (such as the server 105). The servers included in the system 100 may be configured to communicate with one or more user devices (such as the user devices 110, 115) and one or more administrator devices 117 over one or more wired or wireless communication networks 120. Portions of the wireless communication networks 120 may be implemented using a wide area network, for example, the Internet, a local area network, such as Wi-Fi network, or a personal area network such as a Bluetooth™ network. Combinations or derivatives of these networks may also be used. It should be understood that each server included in the system 100 may communicate with various and numerous user devices, and the two user devices 110 and 115 illustrated in FIG. 1 are purely for illustrative purposes. Each server may also communicate with various and numerous administrator devices, and the administrator device 117 is purely for illustrative purposes. Similarly, it should also be understood that the system 100 may include a different number of servers and the single server 105 illustrated in FIG. 1 is purely for illustrative purposes. Also, in some embodiments, the user devices 110, 115, the administrator device 117, or both may communicate with the server 105 through one or more intermediary devices (not shown).

Figure 2:
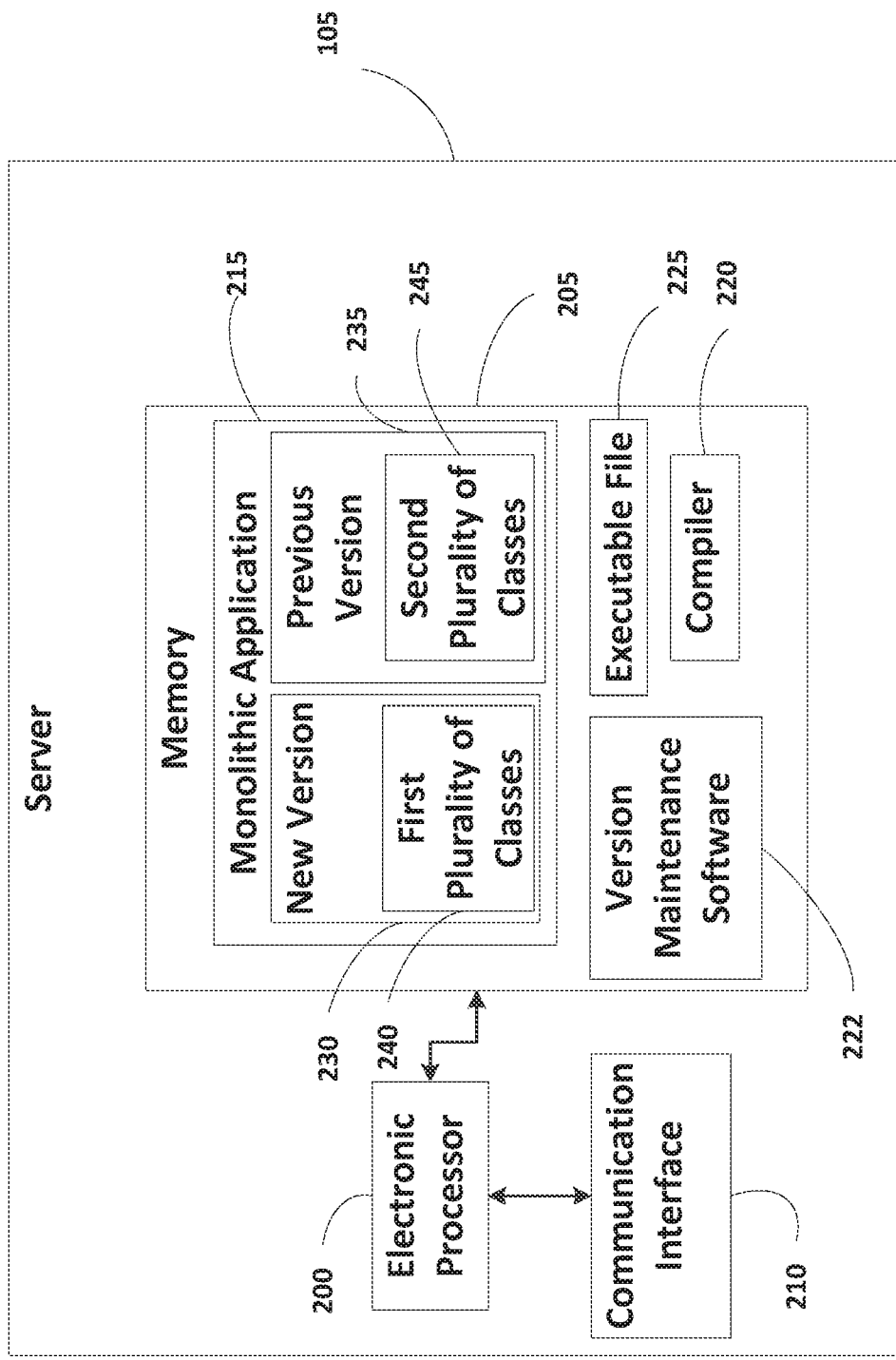
FIG. 2 schematically illustrates a server servicing user devices included in the system of FIG. 1 according to one embodiment.

As illustrated in FIG. 2, the server 105 is an electronic device that includes an electronic processor 200 (for example, a microprocessor, application-specific integrated circuit (ASIC), or another suitable electronic device), a memory 205 (a non-transitory, computer-readable storage medium), and a communication interface 210, such as a network interface or transceiver, for communicating over the communication network 120 and, optionally, one or more additional communication networks or connections. The electronic processor 200, the memory 205, and the communication interface 210 communicate, for example, over one or more communication lines or buses, or a combination thereof. It should be understood that the server 105 may include additional components than those illustrated in FIG.

2 in various configurations and may perform additional functionality than the functionality described in the present application.

The server 105 stores (in the memory 205) a monolithic application 215, a compiler 220, version maintenance software 222, and an executable file 225 (a compiled monolithic application). As described above, a monolithic application (such as the monolithic application 215) is an application without modularity. In the embodiments described herein, the monolithic application 215 is a plurality of computer readable instructions representing one or more versions. When the monolithic application 215 is compiled by the compiler 220 the executable file 225 is created. Specifically, when executed by the electronic processor 200, the compiler 220 performs operations that transform the computer readable instructions included in the monolithic application 215 into computer executable instructions included in the executable file 225. In the embodiments described herein, once the computer readable instructions of the monolithic application 215 are compiled into computer executable instructions, the electronic processor 200 may execute the computer executable instructions included in the executable file 225 to provide functionality to the user devices 110, 115 (deploy the monolithic application 215 to the user devices 110, 115). For example, the monolithic application 215 may provide word processing functionality to the user devices 110, 115 by executing the executable file 225. It should be understood that the functionality described herein as being performed by the server 105 may be distributed among multiple devices, such as multiple servers operated within the system 100. For example, the functionality described as being performed by the server 105 may be distributed amongst multiple servers depending on whether the functionality is performed during compilation of the monolithic application 215 or during run time. In most practical implementations, the version maintenance software 222 and the compiler 220 (software associated with compiling a monolithic application) are stored in a memory and executed by an electronic processor of a first server, while the executable file 225 (software associated with run time) is stored in a memory and executed by an electronic processor of a second server.

The monolithic application 215 may include computer readable instructions that correspond to a plurality of versions of the monolithic application 215. For example, in the embodiment illustrated in FIG. 2, the monolithic application 215 includes a first set of computer readable instructions corresponding to a new version 230 of the monolithic application 215 and a second set of computer readable instructions corresponding to a previous version 235 of the monolithic application 215. Each set of computer readable instructions are organized into a plurality of classes. For example, the new version 230 of the monolithic application 215 includes a first plurality of classes 240 containing the first set of computer readable instructions and the previous version 235 of the monolithic application 215 includes a second plurality of classes 245 containing the second set of computer readable instructions. Computer readable instructions included in each class of the first plurality of classes 240 and the second plurality of classes 245 are further organized into methods that define the functionality of the class.

The previous version 235 of the monolithic application 215 is created when the server 105 receives the new version 230 of the monolithic application 215 from the administrator device 117. As described in further detail below, rather than maintaining two different monolithic applications, one corresponding to the previous version 235 and the other corresponding to the new version 230, the electronic processor 200 executes the version maintenance software 222 to determine the changes that have been made in the new version 230 (compared to the previous version 235) and create a representation of the differences between the new version 230 and the previous version 235. It should be understood that while FIG. 2 illustrates only the previous version 235 the monolithic application 215 may include any number of previous versions.

Figure 3:
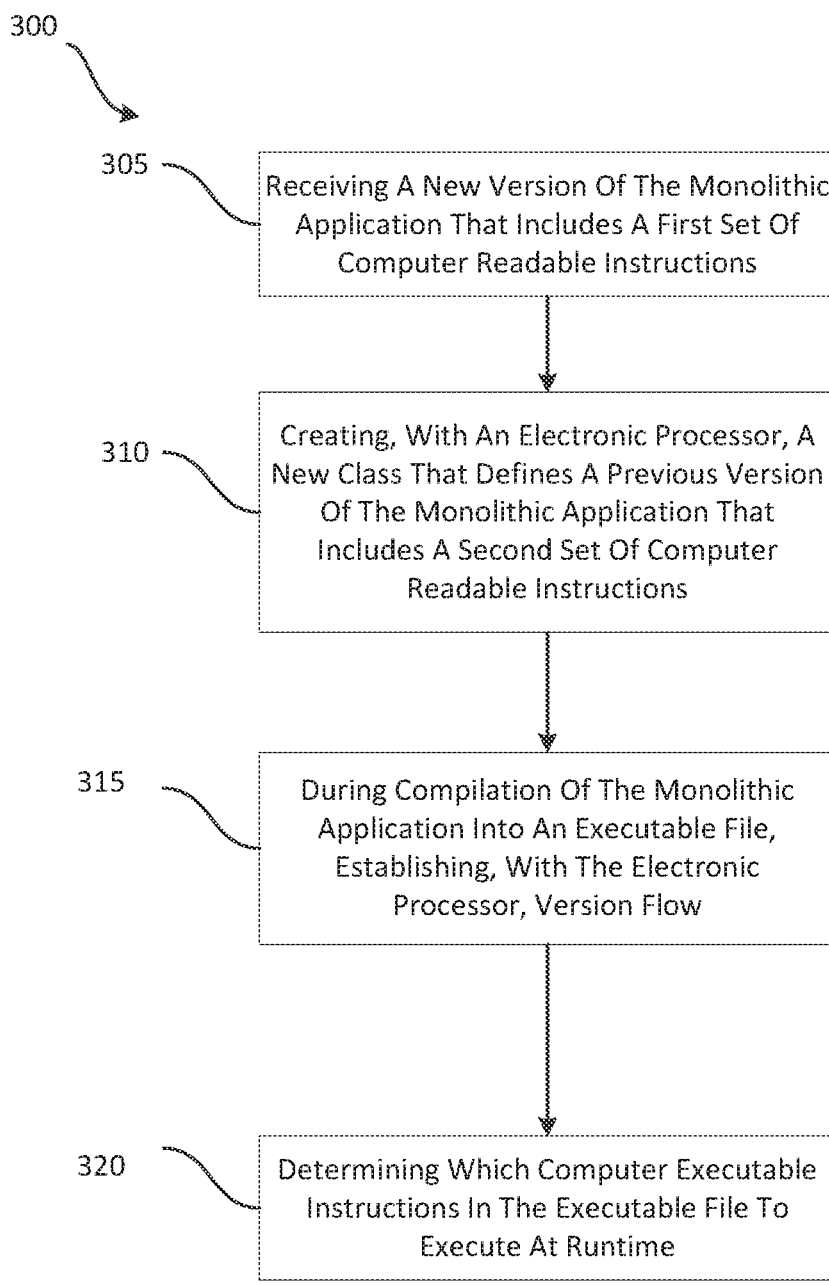
FIG. 3 is a flow chart illustrating a method of updating a monolithic application according to one embodiment.

FIG. 3 illustrates a method 300 of updating a monolithic application. It should be understood that while the method 300 is described below with reference to two versions (the new version 230 and the previous version 235) of the monolithic application 215, the method 300 may be implemented for a plurality of versions. Specifically, multiple previous versions of the monolithic application 215 may exist alongside the new version 230 of the monolithic application 215. In some embodiments, upon receiving the new version 230 of the monolithic application 215 from the administrator device 117 (block 305), the electronic processor 200 executes the version maintenance software 222 to determine which classes of the new version 230 of the monolithic application 215 are different from the corresponding classes of the previous version 235 of the monolithic application 215. It should be noted that, if the version management software 222 is maintaining multiple previous versions of the monolithic application 215, the classes of the new version 230 are compared to the classes of a most recently created previous version of the monolithic application 215. It should be noted that, in some embodiments (including the one described below), the previous version 235 may store all computer readable instructions included in the second set of computer readable instructions, before and while the electronic processor 200 performs the comparison of the versions. Once the comparison of the new version 230 and previous version 235 is completed, the version maintenance software 222 may delete computer readable instructions from the previous version 235 that were not created during the comparison. In other embodiments, all computer readable instructions included in the second set of computer readable instructions may be stored in a temporary location before and while the electronic processor 200 performs the comparison of the versions. Once the comparison of the new version 230 and the previous version 235 is complete, the second set of computer readable instructions are removed from the temporary location (deleted from memory 205).

In some embodiments, a class of the new version 230 of the monolithic application 215 that corresponds to a class of the previous version 235 of the monolithic application 215 is defined herein as a class of the new version 230 that has a name that matches a name of a class of the previous version 235. For each class of the monolithic application 215 included in the previous version 235 of the monolithic application 215, the electronic processor 200 compares the class to its corresponding class in the new version 230 of the monolithic application 215. If the electronic processor 200 determines that there is a difference between the class of the previous version 235 of the monolithic application 215 and the corresponding class of the new version 230 of the monolithic application 215, the electronic processor 200 creates a new class (block 310). The new class that the electronic processor 200 creates includes each method in the class of the previous version 235 of the monolithic application 215 that is different from its corresponding method (a method with the same name) in the corresponding class of the new version 230 of the monolithic application 215. The new class also includes an attribute that defines the version the new class is associated with, the name of the new class and a name of a method included in the new class that is associated with the new version 230. The attribute of the new class is used by the electronic processor 200, via aspect oriented programming, to establish version flow (described in further detail below) when the monolithic application 215 is compiled by the compiler 220. In some embodiments, if a class of the monolithic application 215 included in the previous version 235 of the monolithic application 215 does not have a corresponding class in the new version 230 of the monolithic application 215, the electronic processor 200 may create a new class that includes every computer readable instruction in the class of the previous version 235 of the monolithic application 215. In some embodiments, if a method in the class of the previous version 235 of the monolithic application 215 does not have a corresponding method in the corresponding class of the new version 230 of the monolithic application 215, the electronic processor 200 may include the method in the class of the previous version 235 of the monolithic application 215 in the new class. Once each class of the previous version 235 of the monolithic application 215 is compared to its corresponding class in the new version 230 of the monolithic application 215, the version maintenance software 222 deletes computer readable instructions from the previous version 235 that were not created during the comparison.

FIG. 4 graphically illustrates an example in which the version management software 222 maintains three versions of the monolithic application 215. In Version 100 the monolithic application 215 includes two classes, Class A and Class B. Class A includes three methods, methodA, methodB, and methodC. Class B also includes three methods, methodX, methodY, and methodZ. The electronic processor 200 receives a new version (Version 101) of the monolithic application 215 from the administrator device 117. The electronic processor 200 compares each class in Version 100 to its corresponding class in Version 101. When the electronic processor 200 compares Class A of Version 100 to Class A of Version 101, the electronic processor 200 determines that methodB of Class A is different in Version 101 than it is in Version 100. In order to preserve the Version 100 of the monolithic application 215 (a previous version of the application) the electronic processor 200 creates a new class in the monolithic application 215 that includes the methodB identical to the methodB in the Class A of the Version 100. Specifically, the electronic processor 200 creates the class entitled Class A_Version 100 that includes methodB of Version 100 of the monolithic application 215. Therefore, Version 100 and Version 101 are both included in the monolithic application 215. In some embodiments, the electronic processor 200 also tags the new class as being associated with Version 100. For example, the electronic processor 200 adds a tag specifying that the new class is associated with Version 100 of the monolithic application 215 to metadata associated with the new class.

When the electronic processor 200 receives another new version of the monolithic application 215, the electronic processor 200 compares each class in the Version 101 to its corresponding class in the Version 102. When the electronic processor 200 compares the Class B of the Version 101 to the Class B of the Version 102, the electronic processor 200 determines that the methodY of the Class B is different in the Version 102 than it is in the Version 101. In order to preserve the Version 101 of the monolithic application 215 (the previous version of the application) the electronic processor 200 creates a new class called Class B_Version 101 that includes the methodY that is identical to the methodY that is included in the Version 101. Therefore, three versions (Version 100, Version 101, and Version 102) are defined in the monolithic application 215.

In some embodiments, the electronic processor 200 is configured to maintain a predetermined number of versions or less than a predetermined number of versions of the monolithic application 215. When a number of versions of the monolithic application 215 the electronic processor 200 is maintaining is greater than or equal to a predetermined number of versions, the electronic processor 200 deletes all classes included in the monolithic application 215 that are associated with (or have a tag associated with) the oldest version of the monolithic application 215 that is being maintained. For example, the oldest version may be a version that is last in a list of maintained versions, a version associated with a predetermined time stamp, or the like.

Maintaining a predetermined number of versions of a monolithic application is illustrated in FIG. 4 when a new version (Version 103) is received by the electronic processor 200. When Version 103 is received, the number of versions maintained in the monolithic application 215 is greater than three. Therefore, the electronic processor 200 removes classes associated the Version 100 from the monolithic application 215. In the illustrated example, the electronic processor 200 removes Class A_Version 100 from the monolithic application 215.

Returning to FIG. 3, when the monolithic application 215 is compiled by the electronic processor 200, executing the compiler 220, the versions maintained in the monolithic application 215 are woven together (combined) into the executable file 225 and version flow is established (block 315). Version flow determines, depending on a selection of a version of the monolithic application 215 received from the administrator device 117, which computer executable instructions included in the executable file 225 are executed by the electronic processor 200 at runtime (block 320). Runtime is defined herein as when the executable file 225 is executed by the electronic processor 200.

Figure 5:
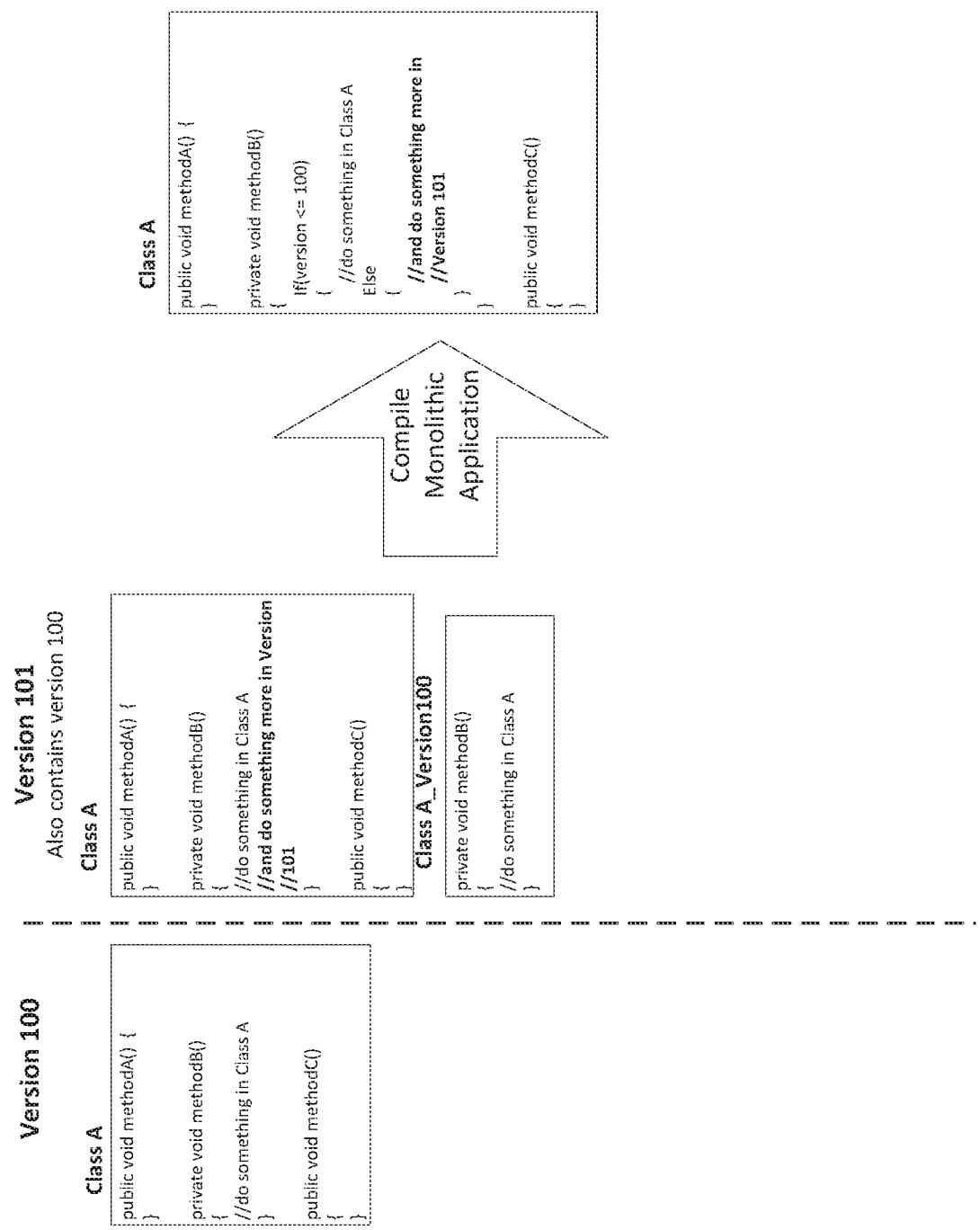
FIG. 5 graphically illustrates an example of establishing version flow when compiling a monolithic application included in the server of FIG. 2 according to one embodiment.

An example of establishing version flow is graphically illustrated in FIG. 5. In the example illustrated in FIG. 5, the monolithic application 215 includes Version 100 and Version 101 when the monolithic application 215 is compiled by the compiler 220. Specifically, the monolithic application 215 includes a class named Class A and a class named Class A_Version 100. When the monolithic application 215 is compiled as illustrated in FIG. 5, Class A and Class A_Version 100 are combined into the executable file 225 by the compiler 220. If a selected version of the monolithic application 215 to execute at runtime is the Version 100, the computer executable instructions within the conditional "if version<=100" of methodB will be executed by the electronic processor 200 at runtime. If the selected version of the monolithic application 215 to execute at runtime is the Version 101, the computer executable instructions within the else conditional of methodB are executed by the electronic processor 200 at runtime.

In addition to including classes that define its versions, the executable file 225 also includes an abstract class with an OnEntry method that is created when the monolithic application 215 is compiled. An example of an OnEntry method is illustrated in the example computer readable instructions included in FIG. 6. The OnEntry method is executed by the electronic processor 200 at runtime to determine which version flow to execute based on the selected version received from the administrator device 117. In FIG. 6, the OnEntry method is called by the DoSomething method. The DoSomething method includes, among other things, the computer executable instructions associated with a new version (such as the new version 230) of the monolithic application 215. When called, the OnEntry method checks, whether a previous version (such as the previous version 235) of the monolithic application 215 is the selected version received from the administrator device 117. If the selected version is the previous version 235, the OnEntry method uses aspect oriented programming to cause the electronic processor 200 to execute the computer executable instructions associated with the previous version 235. If the OnEntry method does not determine that the previous version 235 of the monolithic application 215 is the selected version, the DoSomething method causes the electronic processor 200 to execute the computer executable instructions associated with the new version 230 of the monolithic application 215.

Various features and advantages of some embodiments are set forth in the following claims.

What is claimed is:

1. A method comprising:
   receiving second computer readable instructions representing a new version of a monolithic application; and
   for each class of the monolithic application included in a previous version of the monolithic application:
   comparing methods of the class in the previous version to methods of the class in the new version of the monolithic application to determine whether there is at least one difference between at least one method of the same class in the previous version and the new version; and
   based on determining there is at least one identified difference between at least one method of the same class in the previous version and the new version, creating, with an electronic processor, a new class including new class computer readable instructions, wherein the new class computer readable instructions include at least one method from first computer readable instructions that is different from the method with a same name in the same class of the new version of the monolithic application, wherein the first computer readable instructions represent the previous version of the monolithic application, and the first computer readable instructions are organized into classes that include at least one method that defines functionality of a class;
   compiling an executable file that combines the new version of the monolithic application and the new class by transforming the second computer readable instructions into first computer executable instructions that represent the new version of the monolithic application, transforming the new class computer readable instructions into second computer executable instructions that represent the new class, and combining the first computer executable instructions and the second computer executable instructions to produce the executable file;
   identifying a version of the monolithic application to execute;
   when the identified version is the new version, executing the first computer executable instructions in the executable file; and
   when the identified version is the previous version, executing a subset of the first computer executable instructions, and the second computer executable instructions, wherein the subset of the first computer executable instructions correspond to at least a portion of the new version of the monolithic application that is the same as in the previous version.

2. The method according to claim 1, further comprising: deleting classes included in the monolithic application that are associated with an oldest version of the monolithic application when a number of versions of the monolithic application that are being maintained is greater than or equal to a predetermined number of versions.

3. The method according to claim 1, further comprising: receiving a selection of the version of the monolithic application to execute at a server including the electronic processor.

4. The method according to claim 3, wherein the executing includes executing, at runtime, using a method included in an abstract class of the executable file to determine which computer executable instructions to execute based on the version to execute selected for the server.

5. The method according to claim 1, further comprising: establishing version flow using aspect oriented programming.

6. The method according to claim 1, wherein the new class includes an attribute identifying the new version, the new class, and a method.

7. The method according to claim 1, further comprising: during compilation of the monolithic application into the executable file, combining the new class with the new version of the monolithic application and establishing, with the electronic processor, version flow using the second computer executable instructions.

8. A system comprising
   one or more memories that store first computer readable instructions representing a previous version of a monolithic application, wherein the first computer readable instructions are organized into classes that include at least one method that defines functionality of a class; and
   one or more electronic processors, wherein the one or more electronic processors is configured to cause the system to:
   receive second computer readable instructions representing a new version of the monolithic application; and
   for each class of the monolithic application included in the previous version of the monolithic application:
   compare methods of the class in the previous version to methods of the class in the new version of the monolithic application to determine whether there is at least one difference between at least one method of the same class in the previous version and the new version; and
   based on determining there is at least one identified difference between at least one method of the same class in the previous version and the new version, create a new class including new class computer readable instructions, wherein the new class computer readable instructions include at least one method from the first computer readable instructions that is different from the method with a same name in the same class of the new version of the monolithic application;
   compile an executable file that combines the new version of the monolithic application and the new class by transforming the second computer readable instructions into first computer executable instructions that represent the new version of the monolithic application, transforming the new class computer readable instructions into second computer executable instructions that represent the new class, and combining the first computer executable instructions and the second computer executable instructions to produce the executable file;

identify a version of the monolithic application to execute;

when the identified version is the new version, execute the first computer executable instructions in the executable file; and when the identified version is the previous version, execute a subset of the first computer executable instructions, and the second computer executable instructions, wherein the subset of the first computer executable instructions correspond to at least a portion of the new version of the monolithic application that is the same as in the previous version.

9. The system according to claim 8, further comprising: an administrator device, wherein the one or more electronic processors is further configured to cause the system to receive the second computer readable instructions representing the new version of the monolithic application and a selection of the version of the monolithic application to be executed from the administrator device.

10. The system according to claim 8, further comprising: a user device, wherein the one or more electronic processors is further configured to cause the system to execute the computer executable instructions in the executable file to deploy the monolithic application to the user device.

11. The system according to claim 8, wherein the one or more electronic processors is further configured to cause the system to compile the executable file that combines the new version of the monolithic application and the new class by using aspect oriented programming.

12. The system according to claim 8, wherein the new class includes an attribute identifying the new version, the new class, and a method.

13. The system according to claim 8, wherein the one or more electronic processors is further configured to execute computer executable instructions in the executable file corresponding to a received selection of the version to be executed by using a method included in an abstract class of the executable file to determine which computer executable instructions to execute based on the received selection of the version to be executed.

14. The system according to claim 8, wherein the one or more electronic processors is further configured to cause the system to:

delete classes included in the monolithic application that are associated with an oldest version of the monolithic application when a number of versions of the monolithic application that are being maintained is greater than or equal to a predetermined number of versions.

15. The system according to claim 8, wherein the one or more electronic processors is further configured to cause the system to:

during compilation of the monolithic application into the executable file, combine the new class with the new version of the monolithic application and establish version flow using the second computer executable instructions.

16. A non-transitory, computer-readable medium storing instructions that, when executed by an electronic processor, perform a set of functions, the set of functions comprising:

receiving second computer readable instructions representing a new version of a monolithic application; and for each class of the monolithic application included in a previous version of the monolithic application:

comparing methods of the class in the previous version to methods of the class in the new version of the monolithic application to determine whether there is at least one difference between at least one method of the same class in the previous version and the new version; and based on determining there is at least one identified difference between at least one method of the same class in the previous version and the new version, creating a new class including new class computer readable instructions, wherein the new class computer readable instructions include at least one method from first computer readable instructions that is different from the method with a same name in the same class of the new version of the monolithic application, wherein the first computer readable instructions represent the previous version of the monolithic application, and the first computer readable instructions are organized into classes that include at least one method that defines functionality of a class;

compiling an executable file that combines the new version of the monolithic application and the new class by transforming the second computer readable instructions into first computer executable instructions that represent the new version of the monolithic application, transforming the new class computer readable instructions into second computer executable instructions that represent the new class, and combining the first computer executable instructions and the second computer executable instructions to produce the executable file;

identifying a version of the monolithic application to execute;

when the identified version is the new version, executing the first computer executable instructions in the executable file; and when the identified version is the previous version, executing a subset of the first computer executable instructions, and the second computer executable instructions, wherein the subset of the first computer executable instructions correspond to at least a portion of the new version of the monolithic application that is the same as in the previous version.

17. The non-transitory, computer-readable medium of claim 16, wherein the set of functions further includes receiving a selection of the version of the monolithic application to execute at a server including the electronic processor.

18. The non-transitory, computer-readable medium of claim 17, wherein the executing includes executing, at runtime, using a method included in an abstract class to determine which code to execute based on the version to execute selected for the server.

19. The non-transitory, computer-readable medium according to claim 16, wherein the set of functions further comprise:

deleting classes included in the monolithic application that are associated with an oldest version of the monolithic application when a number of versions of the monolithic application that are being maintained is greater than or equal to a predetermined number of versions.

20. The non-transitory, computer-readable medium according to claim 16, wherein the set of functions further comprise:

during compilation of the monolithic application into the executable file, combining the new class with the new version of the monolithic application and establishing version flow using the second computer executable instructions.

* * * * *